United States Patent
Snider et al.

(10) Patent No.: US 6,263,283 B1
(45) Date of Patent: Jul. 17, 2001

(54) APPARATUS AND METHOD FOR GENERATING SEISMIC ENERGY IN SUBTERRANEAN FORMATIONS

(75) Inventors: Philip M. Snider; Charles A. Meeder, both of Houston; Robert W. Wiley, Sugarland, all of TX (US); John F. Schatz, Del Mar, CA (US); Joseph P. Haney, Coeur d'Alene, ID (US); David S. Wesson, Fort Worth, TX (US)

(73) Assignee: Marathon Oil Company, Findlay, OH (US)

( * ) Notice: Subject to any disclaimer, the term of this patent is extended or adjusted under 35 U.S.C. 154(b) by 0 days.

(21) Appl. No.: 09/365,239

(22) Filed: Jul. 30, 1999

Related U.S. Application Data

(60) Provisional application No. 60/095,277, filed on Aug. 4, 1998.

(51) Int. Cl.[7] .................................................. G01V 1/40
(52) U.S. Cl. ............................................. 702/6; 166/308
(58) Field of Search .................................... 702/6, 14

(56) References Cited

U.S. PATENT DOCUMENTS

| | | | |
|---|---|---|---|
| 3,029,732 | 4/1962 | Greene ................................ | 102/21.6 |
| 3,064,733 | 11/1962 | Bourne, Jr. .......................... | 166/55 |
| 3,366,188 | 1/1968 | Hicks .................................. | 166/297 |
| 3,376,375 | 4/1968 | Porter ................................. | 175/4.58 |
| 3,952,832 | 4/1976 | Elmore et al. ...................... | 181/116 |
| 4,039,030 | 8/1977 | Godfrey et al. .................... | 166/299 |
| 4,148,375 | * 4/1979 | Dowler et al. ...................... | 181/117 |
| 4,191,265 | 3/1980 | Bosse-Platiese ................... | 175/4.6 |
| 4,253,523 | 3/1981 | Ibsen .................................. | 166/299 |
| 4,391,337 | 7/1983 | Ford et al. .......................... | 175/4.6 |
| 4,502,550 | 3/1985 | Ibsen .................................. | 166/297 |
| 4,598,775 | 7/1986 | Vand et al. ......................... | 175/4.6 |
| 4,633,951 | 1/1987 | Hill et al. ............................ | 166/63 |
| 4,683,943 | 8/1987 | Hill et al. ............................ | 166/63 |
| 4,711,302 | 12/1987 | Jennings, Jr. ...................... | 166/250 |
| 4,798,244 | 1/1989 | Trost .................................. | 166/260 |
| 4,823,875 | 4/1989 | Hill .................................... | 166/280 |
| 4,823,876 | 4/1989 | Mohaupt ............................ | 166/299 |
| 5,005,641 | 4/1991 | Mohaupt ............................ | 166/63 |
| 5,355,802 | 10/1994 | Petitjean ............................ | 102/313 |
| 5,441,110 | * 8/1995 | Scott, III ............................ | 166/308 |
| 5,451,164 | * 9/1995 | Henderson et al. ................ | 434/299 |
| 5,598,891 | * 2/1997 | Snider et al. ...................... | 166/308 |
| 5,930,730 | * 7/1999 | Marfurt et al. .................... | 702/16 |
| 5,936,913 | * 8/1999 | Gill et al. ........................... | 367/25 |

OTHER PUBLICATIONS

*Journal of Petroleum Technology*, "Technology Digest; High–Energy–Gas Well Stimulation," Feb. 1998, pp. 16 and 83.

Haney et al., "The Application of an Optimized Propellant Stimulation Technique in Heavy Oil Wells," SPE 37531, 1997, pp. 173–182.

\* cited by examiner

*Primary Examiner*—Christine Oda
*Assistant Examiner*—Victor J. Taylor
(74) *Attorney, Agent, or Firm*—Jack E. Ebel

(57) ABSTRACT

A method of creating a seismic wave in a subterranean environment wherein solid propellant material is positioned in a subterranean well and ignited thereby generating a seismic wave. The seismic wave is recorded at distance from where the propellant material is ignited by means of geophones or similar recording devices. The propellant material is geometrically configured with the assistance of computer modeling. The pressure generated by the ignition is recorded in the well and used to validate the computer model for configuring subsequent propellant material employed as a seismic source.

37 Claims, 14 Drawing Sheets

APPARATUS AND METHOD FOR GENERATING SEISMIC ENERGY IN SUBTERRANEAN FORMATIONS

This application claims the benefit of U.S. Provisional Application Ser. No. 60/095,277 filed on Aug. 4, 1998.

BACKGROUND OF THE INVENTION

1. Field of Invention

The present invention relates generally to an apparatus for generating a seismic signal and method for utilizing such apparatus in conducting seismic exploration of subterranean strata, and more particularly, to such an apparatus and method wherein a propellant is employed to generate repeatable, reliable seismic sources from a downhole location in a subterranean well bore.

2. Description of Related Art

Seismic data which is recorded by recording devices placed in an array at the surface of the earth or on the sea floor is increasingly used to evaluate and map subsurface structures for the purpose of exploring for and exploiting oil, gas and/or mineral reserves. Impact devices, such as vibratory sources, gas guns, air guns, and weight drops, have conventionally been employed at the earth's surface as a seismic source to generate shear and compressional waves in subterranean strata. Often, it is desirable to locate a seismic source at a downhole location in proximity to the particular subterranean strata(s) of interest. In view of this, a need exists for a seismic source which is located in a subterranean bore hole which is reliable and which generates repeatable, broad bandwidth compressional and/or shear waves while imparting minimal damage to the bore hole.

Thus, it is an object of the present invention to provide an apparatus for generating a seismic signal and method for utilizing such apparatus in conducting seismic exploration of subterranean strata which generates repeatable, reliable seismic sources from a downhole location in a subterranean well bore.

It is also object of the present invention to provide an apparatus which utilizes solid propellant for generating a seismic signal in a subterranean bore hole.

It is another object of the present invention to provide an apparatus for generating seismic signals utilizing propellant wherein the dimensions of the solid propellant may be varied to produce compressional and/or shear waves of varying amplitude and/or frequency.

It is still another object of the present invention to use downhole pressure gauges to relate pressure data to seismic data and as a result vary the propellant dimensions of the seismic source apparatus to obtain the desired compressional and/or shear waves.

It is a further object of the present invention to provide an apparatus for generating a seismic signal which may be employed in a subterranean bore hole which is either cased or open hole.

It is a still further object of the present invention to use computer modeling software to create the desired seismic energy source by selecting the geometric configuration of the propellant before actually conducting work in real well bores and to use the field data from fast recording pressure, acceleration, and strain gauges to validate the accuracy of the computer modeling estimates.

SUMMARY OF THE INVENTION

To achieve the foregoing and other objects, and in accordance with the purposes of the present invention, as embodied and broadly described herein, one characterization of the present invention is a method for creating a seismic wave in a subterranean environment which comprises suspending from the surface of the earth a first solid propellant material within a subterranean well bore and igniting the first solid propellant material in the subterranean well bore thereby generating a seismic wave.

In another characterization of the present invention, a method of creating a seismic wave in a subterranean formation which is penetrated by a well bore is provided. The method comprises detonating at least one explosive charge in the well bore thereby igniting at least one piece of propellant material which is interposed between the at least one explosive charge and the walls of the well bore.

BRIEF DESCRIPTION OF THE DRAWINGS

The accompanying drawings, which are incorporated in and form a part of the specification, illustrate the embodiments of the present invention and, together with the description, serve to explain the principles of the invention.

In the drawings.

DESCRIPTION OF THE PREFERRED EMBODIMENTS

Figure 1:
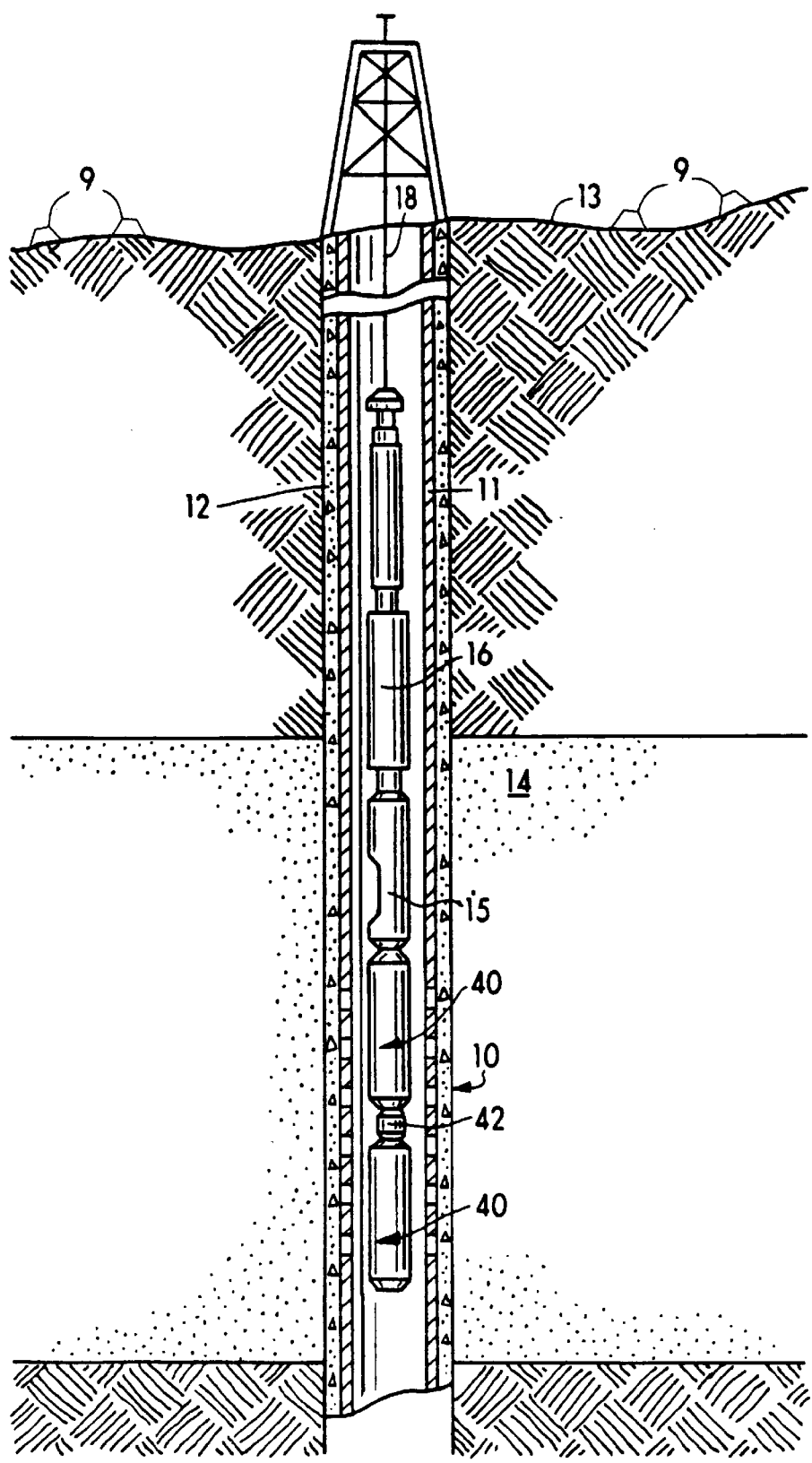
FIG. 1 is a cross sectional view of the apparatus of the present invention as positioned within a well penetrating a subterranean formation.

As illustrated in FIG. 1, one or more seismic source apparatus 40 of the present invention are secured to the one end of an adapter sub 15 by any suitable means, such as screw threads. The other end of the adapter sub 15 is connected to one end of a logging tool 16, such as a collar log, by any suitable means, such as screw threads, while the other end of logging tool 16 is connected to a cable head 17 by any suitable means, such as screw threads. Cable head 17 is secured to a conventional wireline 18 and the seismic source apparatus 40 are lowered into well 10. A coupling 42 (FIGS. 2C and 2D) may be utilized to secure apparatus 40 together. Any suitable means, such as a packer and tubing (not illustrated), may be employed to isolate the portion of well 10 adjacent a subterranean interval 14, if desired. Alternatively, slick line, coil tubing, a tubing string or any other suitable means as will be evident to a skilled artisan may be used to position and support one or more apparatus 40 within a subterranean well bore.

Figure 2A:
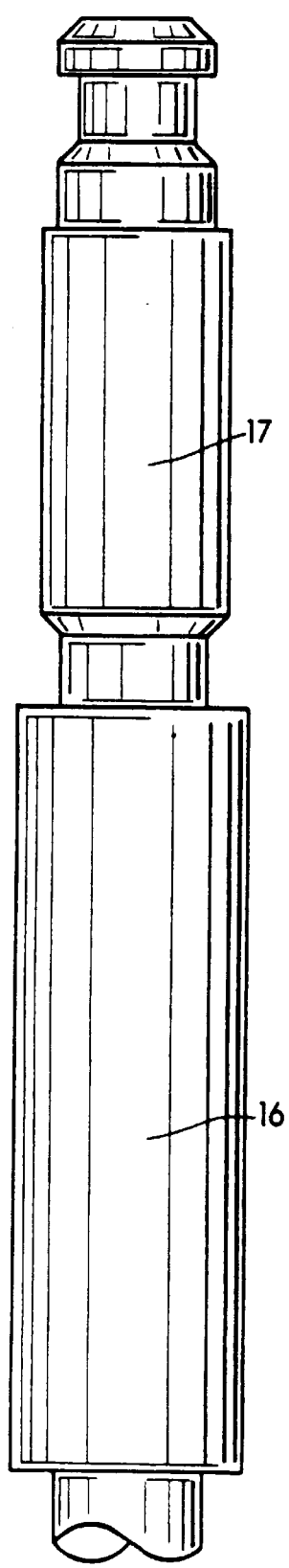
FIGS. 2A–B are partially cutaway, cross sectional views of the apparatus of one embodiment of the present invention.
Figure 2B:
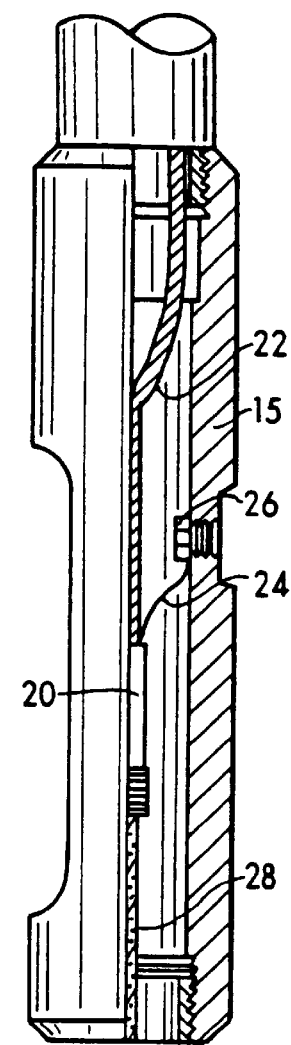

Referring to FIGS. 2A–D, two seismic source apparatus 40 of the present invention are illustrated as secured together by means of a coupling 42. Each apparatus 40 comprises a carrier 44 having one or more apertures, ports or openings 45 therethrough. Where carrier 44 is provided with a plurality of aperture(s) 45, these apertures may be either uniformly or randomly spaced, or otherwise geometrically distributed about the periphery of carrier 44 to control seismic signal shape and direction and may either extend along a portion of or along substantially the entire length of carrier 44 and have a uniform or varying density along the length or periphery thereof. As utilized herein, the term "aperture" denotes a hole or port through the wall of carrier 44 or a relatively thin area in the wall of carrier 44 which ruptures upon detonation of an ignition means, such as a detonating cord. Although illustrated in FIGS. 2C and 2D as generally circular in cross section, aperture(s) 45 can be formed to have any other suitable cross sectional configuration, for example star shaped, cross shaped, etc., as will be evident to a skilled artisan. Carrier 44 is preferably formed of metal, such as a high grade steel. Each end of carrier 44 is provided with a suitable means of connection, such as screw threads 46. Carrier 44 may be bowed or constricted at one or more locations along the length thereof, although carrier 44 is preferably substantially straight as illustrated in FIGS. 2C and 2D.

Propellant 50 is secured to the outer surface 48 of carrier 44 by any suitable means, such as by molding the propellant thereon in a manner as described below. Propellant 50 may extend along the entire length of carrier 44 or a portion thereof, may extend about the entire circumference of carrier 44 or only a portion thereof, and preferably is positioned so as to cover at least a portion of at least one aperture 45. Although illustrated in FIGS. 2C and 2D as having a generally cylindrical in configuration, propellant may have other suitable configurations, for example spiral, one or more linear or curved strips, one or more generally annular rings, etc. Propellant 50 is constructed of a water repellant or water proof propellant material which is not physically effected by hydrostatic pressures commonly observed in a subterranean well bore during completion or production operations and is unreactive or inert to almost all fluids, in particular those fluids encountered in a subterranean well bore. Preferably, the propellant is a cured epoxy or plastic having an oxidizer incorporated therein such as that commercially available from HTH Technical Services, Inc. of Coeur d'Alene, Id. and Owen Oil Tools, Inc. of Fort Worth, Tex. This propellant requires two independent conditions for ignition. The propellant must be subjected to a relatively high pressure, such as at least about 500 psi, and an ignition means must be fired.

Preferably, epoxy or plastic propellant which has an oxidizer incorporated therein is poured or injected into a mold (not illustrated) which is positioned around carrier 44 at a suitable location at the surface 14 in a manner as will be evident to a skilled artisan. A suitable mold may be positioned within carrier 44 and sized to permit propellant from extending into aperture(s) 45. In this manner, propellant 50 extends into aperture(s) 45 but terminates substantially at the inner diameter of carrier 44 as illustrated in FIGS. 2C and 2D. Propellant 50 is allowed to cure at ambient or elevated temperature so as solidify. As also illustrated in FIG. 2, propellant 50 is preferably provided with tapered ends 51 and is formed so as not to cover any portion of screw threads 46 of carrier 44. And although carrier 44 preferably has a substantially round cross sectional configuration, carrier 44 may also have any other cross sectional configuration, for example square, oval etc., that may be desired for a given subterranean well bore and/or seismic application as will be evident to a skilled artisan.

An electrical cable 22 is connected at one end thereof to cable head 17 and at the other end thereof to a starter means, for example electrical detonator 20, which is positioned within adapter sub 15. Detonator 20 is grounded to sub 15 by means of ground wire 24 which is attached to sub 15 by any suitable means, such as screw 26. An ignition means, for example detonator cord 28 which is comprised of an explosive, is secured to detonator 20 and extends into apparatus 40. Detonator cord 28 preferably extends through the entire length of each apparatus 40. Although detonator cord 28 may be attached to the internal circumference of each carrier 44 by any suitable means, such as by metal clips, detonator cord 28 is preferably suspended only from detonator 20 and is allowed to be unsecured to carrier 44 as positioned and suspended therein. As constructed and assembled together, screw threads 46 on one end of a carrier 44 are mated with corresponding screw threads on adapter sub 15.

In operation, adapter sub 15 is connected to logging tool 16 and cable head 17 as described above. Cable head 17 is secured to a conventional wireline 18 and the propellant apparatus are lowered into well 10 adjacent interval 14 or other zone of interest. Carrier(s) 44 provide sufficient rigidity and internal structural integrity to apparatus 40 to ensure effective placement of the apparatus within a subterranean well bore, especially small diameter, deviated, and/or high temperature well bores, while inhibiting damage. Once positioned, current is passed from a suitable source at the surface via wireline 18 and electrical cable 22 to ignite detonator 20 which in turn ignites detonating cord 28. The temperature and pressure resulting from the ignition of the detonating cord ignites the propellant 50 at discrete locations in a predetermined pattern where propellant 50 extends into aperture(s) 45. The propellant 50 in aperture(s) 45 is confined and as such is easily ignited and develops a very rapid bum rate. The ignition of the propellant in aperture(s) 45 generates sufficient heat and pressure to ignite the remaining propellant 50 which is positioned outside of carrier 44.

Pressurized gas which is generated in well 10 from the burning of propellant 50 enters formation 14 either directly in the case of an open hole completion or through perforations formed in casing 11 thereby generating a seismic wave that propagates through formation 14. Both compressional and shear waves can be induced in the formation dependent on geometry of the propellant, the exact carrier utilized, the ignition sequence of single or multiple seismic source apparatus and the position of the seismic source apparatus in the well.

Where the seismic source apparatus is ignited in a well having casing which is not perforated, the rapid expansion of the high pressure gas within the confined spaced of the cased well imparts a pressure pulse against the casing which in turn imparts a seismic wave (mechanical) into the surrounding subterranean formation. Carrier 44 is designed for multiple uses but if damaged, may be removed from the well via wireline 18, refurbished and reused. The compressional and/or shear waves produced from ignition and burning of the propellant are recorded by one or more conventional geophones 9 which are arranged at the surface 13 of the earth or in nearby well(s) in a predetermined array or pattern. These geophones are timed to record upon passing current via wireline 18 to apparatus 40 in order to synchronize recording with the initiation of the propellant burn and the passage of seismic signals. Such synchronization is achieved by means of a device, such as a coil, which is attached to wireline 18, or other electrical cable if used, so as to detect by induction the current pulse which occurs upon the firing of detonator 20 as will be evident to a skilled artisan. Since the propellant burns slower than other conventional explosives, more seismic or mechanical energy is imparted to the subterranean strata thereby inducing less bore hole damage. By varying the dimensions, i.e. length and /or thickness, of propellant 50, shear energy resulting from burning the propellant is also varied. As previously mentioned, the configuration of propellant 50 may also be varied to produce compressional waves or shear waves having a desired signal, i.e. amplitude and/or frequency. Where multiple seismic source apparatus are employed in accordance with the present invention as illustrated in FIG. 1, each source may be separately fired to produce a separate seismic event which is recorded by the geophone array 9 at the surface 13. Further, after firing of a seismic source apparatus, the remaining seismic source apparatus may be repositioned within the well prior to subsequent ignition. This sequence of firing one source apparatus and repositioning another in the well by raising or lowering the wireline, slick line, tubing or coil tubing can be repeated several times as desired. Where only one seismic source apparatus is initially positioned within a well, the source may be ignited and another source apparatus may be subsequently lowered into the well for ignition.

Figure 3:
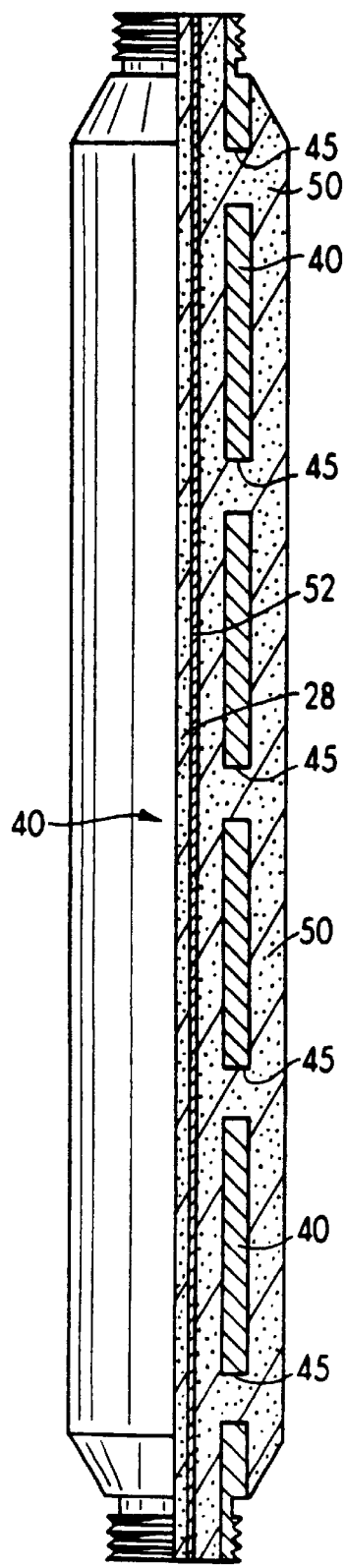
FIG. 3 is a partially cutaway, cross sectional view of another embodiment of the apparatus of the present invention.

Referring now to FIG. 3, another embodiment of the propellant apparatus of the present invention is illustrated generally as 40 and comprises an internal carrier 44 having propellant molded thereon. In this embodiment, a relatively small diameter inner tube 52 is positioned within carrier 44 and is preferably concentric therewith. Propellant 50 is poured into a mold surrounding carrier 44 and is allowed to fill the interior of carrier through aperture(s) 45 such that when cured propellant 50 forms a solid mass which extends from inner tube 52 through aperture(s) 45 to the exterior of carrier 44. In this embodiment, detonator cord 28 is positioned within inner tube 52 which disintegrates from the heat and pressure generated by the apparatus of the present invention.

Figure 4:
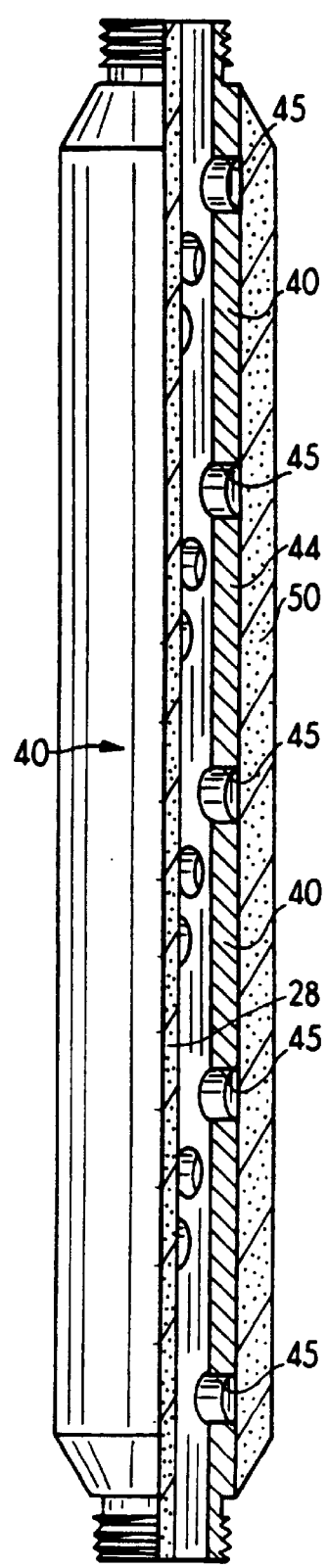
FIG. 4 is a partially cutaway, cross sectional view of still another embodiment of the apparatus of the present invention.

In the embodiment of the present invention which is illustrated in FIG. 4, a sleeve of suitable material, for example cardboard, is positioned around carrier 44 prior to propellant 50 being molded thereon in a manner as described above. As thus constructed, propellant 50 does not extend into aperture(s) 45 any significant distance. Alternatively, a sleeve of propellant 50 may be separately molded or formed and appropriately sized so as to be subsequently positioned around carrier 44 and held in place by any suitable means as will be evident to a skilled artisan. In the embodiment which is illustrated in FIG. 4, detonator cord 28 is positioned within carrier 44 and may or may not be secure to the inner diameter thereof.

Although carrier 44 and adapter sub 15 are preferably constructed of metal, carrier 44 and adapter sub 15 may be constructed of a material which substantially entirely breaks up or decomposes, for example a polyester fiber, epoxy composite, upon detonation of detonator 20.

Figure 5:
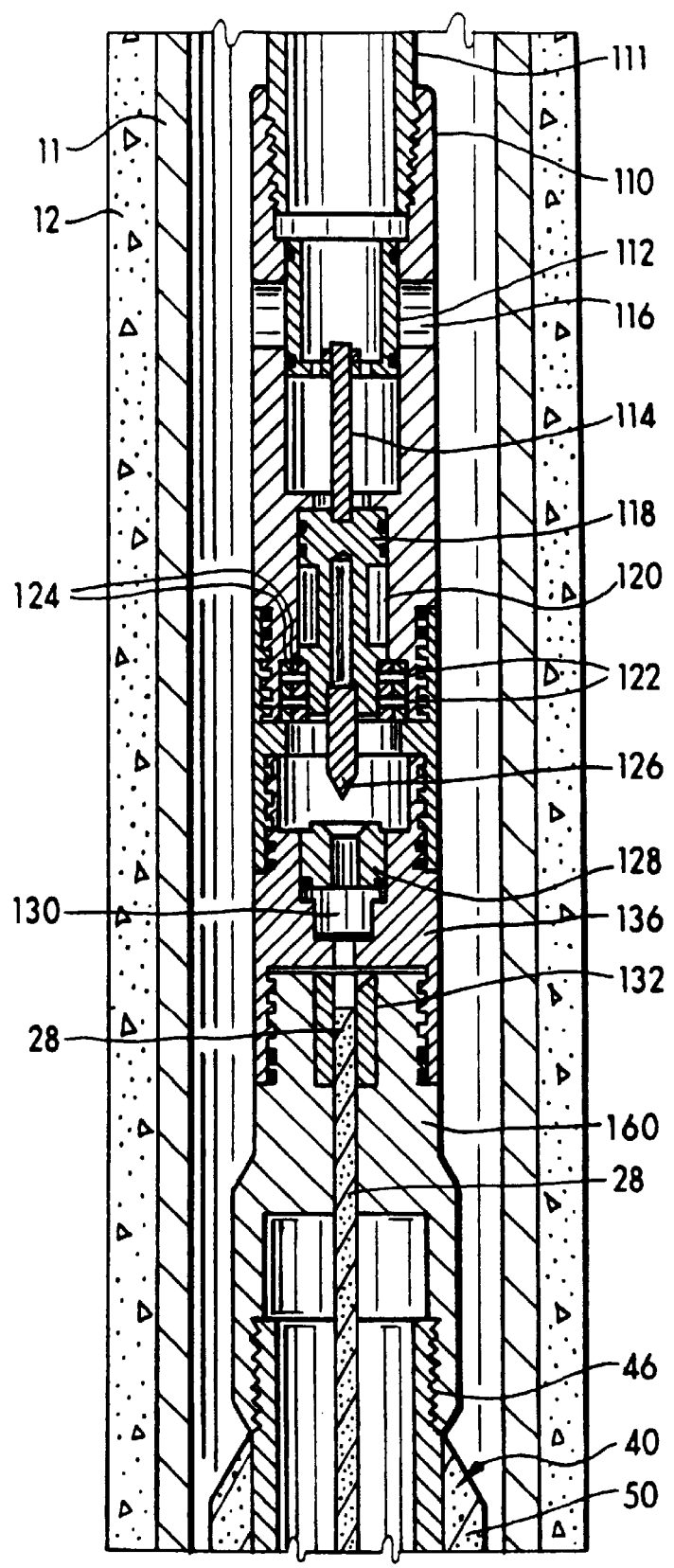
FIG. 5 is a cross sectional view of a percussion detonating system suitable for use in the present invention.

As described above and shown in FIG. 2B, an electrical detonator provides detonation of cord 28, and in turn propellant 50, where the stimulation apparatus of the present invention is run into a subterranean well on a wireline, slickline, etc. Alternatively, a percussion detonator may be employed, and is preferred for use in conjunction with the apparatus of the present invention where the apparatus is run into a subterranean well on a tubular, for example a conventional tubing string or coil tubing. As illustrated in FIG. 5, vent housing 110 is capable of attachment to the end of a tubing string 111 or wireline (not shown). A vent 112 is attached to connecting rod 114 inside vent housing 110 and seals fluid passage 116. Rod 114 is in contact with a piston 118. An annular chamber 120 between piston 118 and the interior wall of housing 110 is filled with air at atmospheric pressure. Adjacent the bottom of piston 118, shear pins 122 are mounted in shear set 124, and a firing pin 126 extends downward from the bottom of piston 118. Retainer 128 joins vent housing 100 and tandem sub 60. Percussion detonator 130 is mounted in retainer 128 in firing head 136 which is attached to vent housing 110 and capable of attachment to tandem sub 60. Sub 60 is attached to propellant apparatus 40. An ignition transfer 132 at the top of sub 60 is in contact with detonating cord 28 passing through central channel 134 and propellant apparatus 40, as described above. A booster transfer is located in each tandem sub 60, linking the detonating cords in the propellant apparatus 40 above and below the tandem sub.

Upon application of sufficient hydraulic pressure to the top of piston 118, vent 112 and piston 118 simultaneously move downward, opening fluid passage 114 and causing firing pin 126 to contact percussion detonator 130. The ignition of percussion detonator 130 causes a secondary detonation in ignition transfer 132, which in turn ignites detonating cord 28. Detonating cord 28 comprises an explosive and runs between the ends of each propellant apparatus. Cord 28 ignites the propellant 50 in apparatus 40 and booster transfer, which contains a higher grade explosive than detonating cord 28.

As discussed above, the ignition means may be a detonating material, such as detonating cord 28. Alternatively, the ignition means may be a deflagrating material or cord. For example, a tube containing black powder may be utilized as the ignition system to ignite the propellant in the apparatus and method of the present invention.

Figure 6:
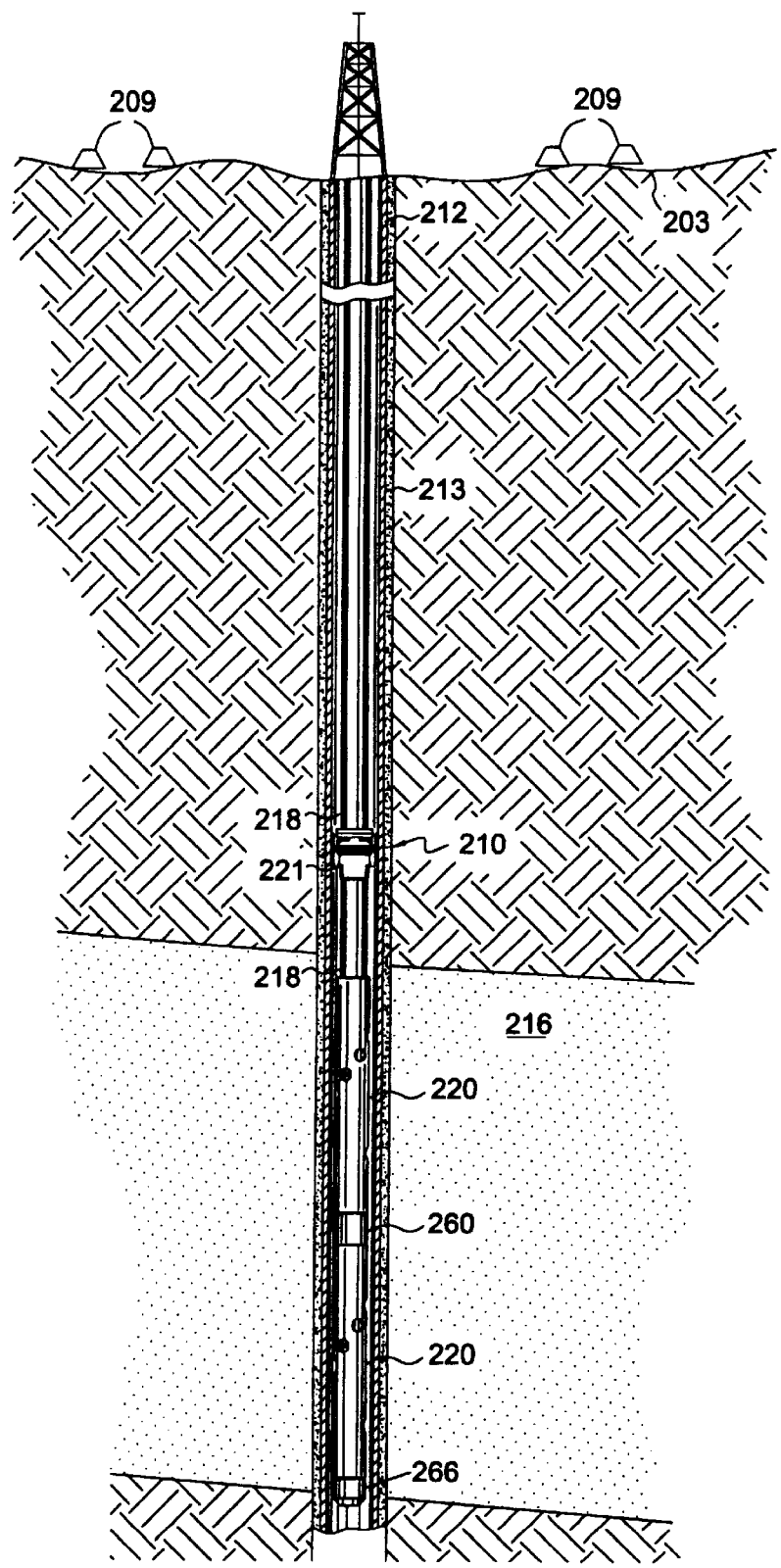
FIG. 6 is a cross sectional view of another embodiment of the apparatus of the present invention as positioned within a well penetrating a subterranean formation.

As illustrated in FIG. 6, one or more seismic source apparatus 220 of the present invention are secured to the lower end of tubing string 218 and lowered into subterranean well 210 which extends from the surface 203 of the earth to a depth to which the well was drilled. The upper most apparatus 220 as positioned within well 210 may be secured directly to the end of tubing string 218. A tandem sub 260 may be utilized to secure apparatus 220 together while a bull plug 266 may be secured to the terminal end of the lowermost apparatus 220. A tubing string may be utilized to position and support the apparatus of the present invention within a well bore. Tubing will preferably be employed to convey several apparatus 220 into the same well bore. Alternatively, a wireline, slick line, coil tubing or any other suitable means as will be evident to a skilled artisan may be used to position and support one or more apparatus 220 within a well bore.

Figure 7:
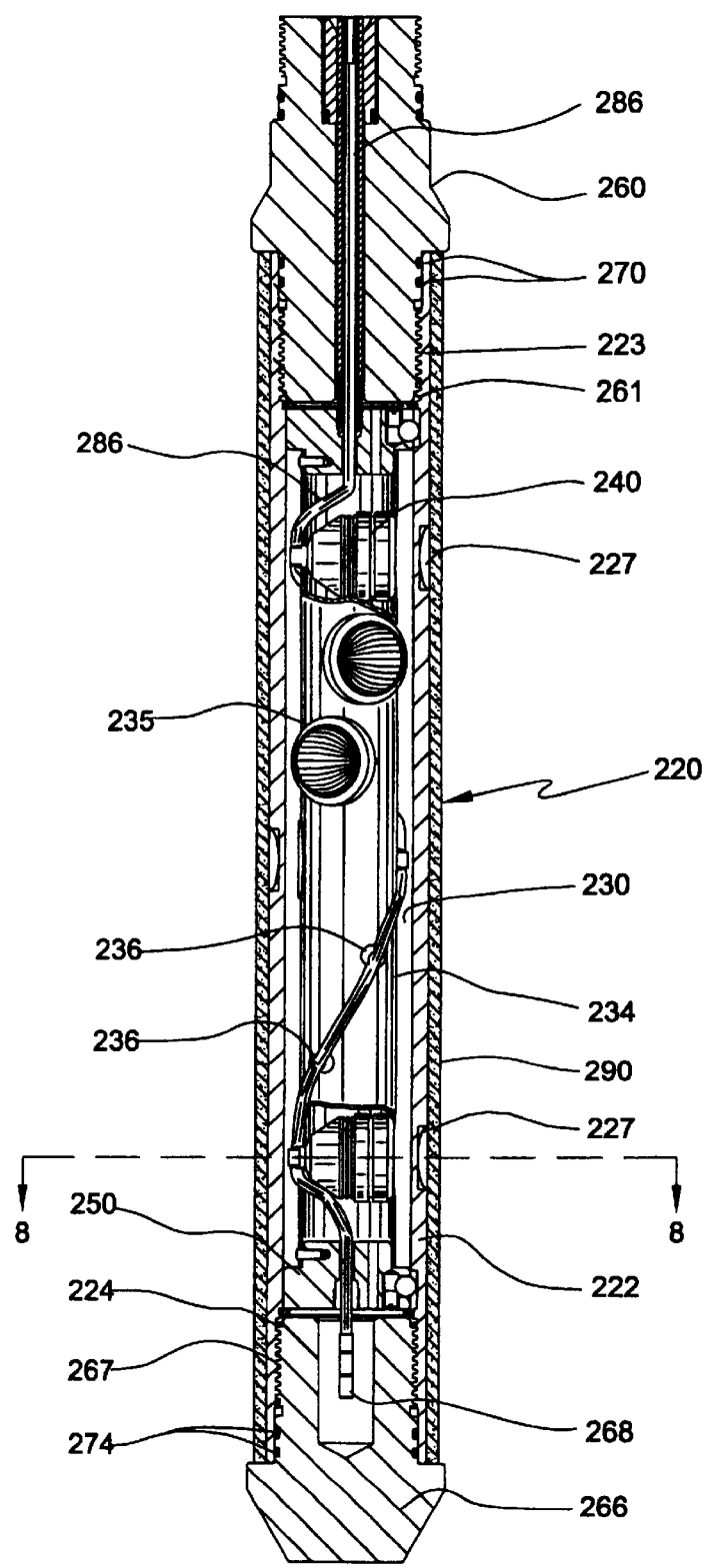
FIG. 7 is a cross sectional view of one embodiment of the apparatus of the present invention as illustrated in FIG. 6.

Referring now to FIG. 7, the seismic source apparatus of the present invention is illustrated generally as 220 and has one end thereof secured to a tandem sub 260 while the other end thereof is secured to a bull plug 266. A punch charge carrier 222 is positioned between tandem sub 260 and bull plug 266 and is secured thereto by any suitable means, such as by mating screw threads 223 and 224 which are provided in the internal surface of carrier 222 adjacent each end thereof with corresponding threads 261 and 267 of tandem sub 260 and bull plug 266, respectively. O-rings 270 provide a fluid tight seal between carrier 222 and tandem sub 220 while O-rings 274 provide a fluid tight seal between carrier 122 and bull plug 266. Carrier 222 may be a commercially available carrier for punch charges and contains at least one shaped explosive charge 240 capable of creating an aperture in the carrier wall 230 but not well casing 212 (if present) or the adjacent subterranean formation 216. A charge tube 234 is positioned within carrier 222 and has at least one relatively large aperture or opening 235 and a plurality of smaller apertures or openings 236 therein. Openings 235 in the wall of charge tube 234 may be spaced both vertically along and angularly about the axis of the tube. Charge carrier 222 and charge tube 234 have generally elongated tubular configurations. A punch charge 240 has a small end 246 secured in an aperture or opening 236 in charge tube 234, as described below, and a large end 248 aligned with and protruding through opening or aperture 235 in tube 234. At least one punch charge 240 is mounted in charge tube 234. A detonating cord 286 is connected to a detonator above tandem sub 260, to the small end 246 of each punch charge 240, and to end cap 268 in bull plug 266. One or more additional combinations of a charge carrier, booster transfer and a tandem sub could be mounted above carrier 222. Tube alignment end plates 250 function to align charge tube 234 within carrier 222 so that the front of each charge is adjacent a scallop 227 in the wall of carrier 222.

If multiple charges are present, they may be spaced vertically along and angularly about the axis of the carrier. The charge density is an appropriate density determined by methods known to those skilled in the art. Common charge densities range between two and twenty four per foot. Detonating cord 286 connects a booster transfer (not illustrated) in tandem sub 260 above carrier 222, all charges 240, and end cap 268 in bull plug 266.

Figure 8:
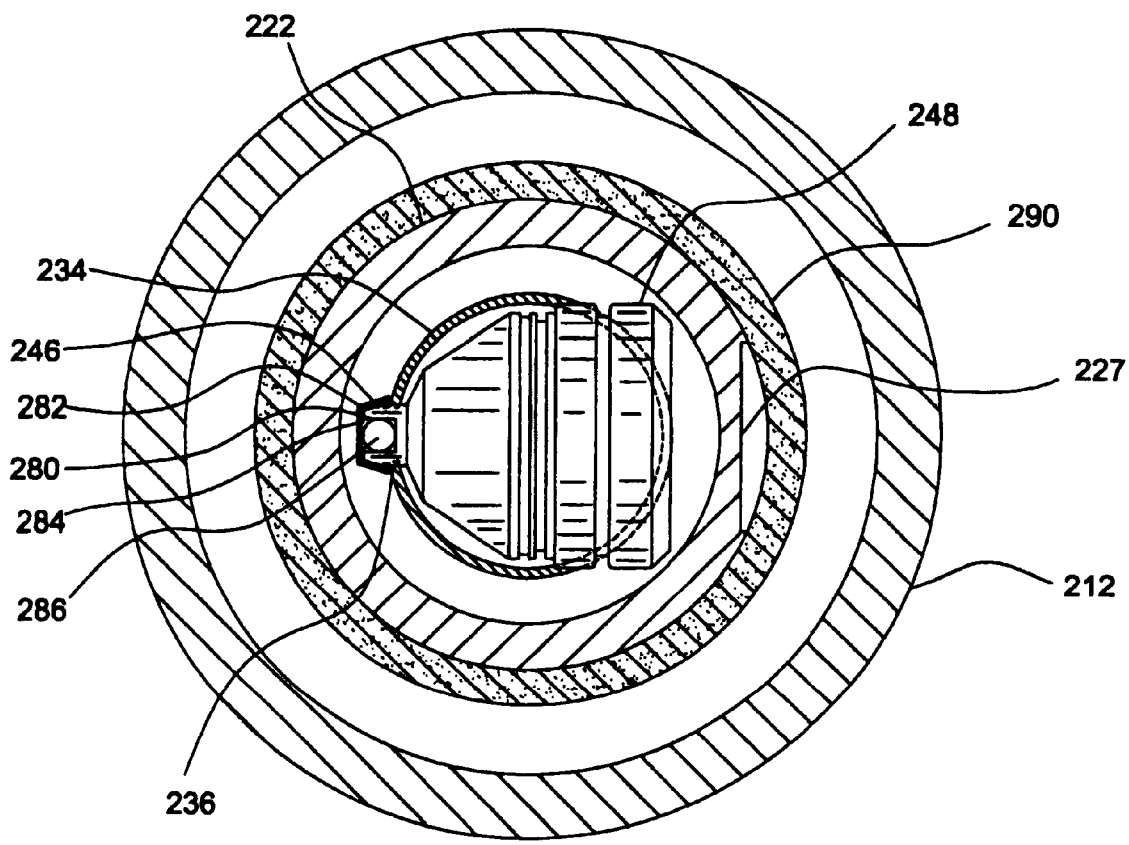
FIG. 8 is a cross sectional view illustrating the spatial relationships between the certain component parts of the apparatus of the present invention taken along line 8—8 of FIG. 7.

As illustrated in FIG. 8, brackets 280 on the small end 246 of punch charge 240 extend through opening 236 in charge tube 234. A clip 282 secures punch charge 240 to charge tube 234. Detonating cord 286 is threaded through a space 284 between brackets 280 and clip 282. Charge tube 234 is mounted in carrier 222 so that the small end 246 of charge 240 is adjacent scallop 227 in carrier 222.

Figure 9:
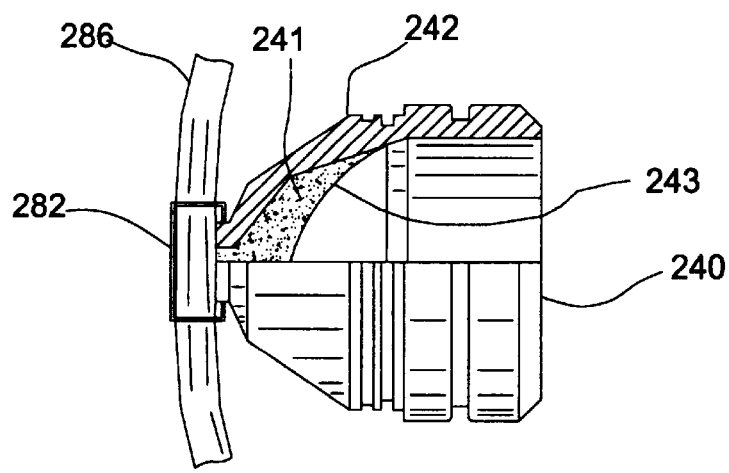
FIG. 9 is a partial cross sectional view of a punch charge as connected to a detonating cord.

Referring to FIG. 9, a punch charge is illustrated generally as 240. A highly compressed explosive 241 partially fills charge case 242. Charge case 242 may have any shape known to those skilled in the art. Depending on the type of case utilized, the volume and shape of explosive 241 can be varied to achieve the desired results. In general, unlined punch charges contain less explosive than perforating charges, and are shaped so that only the charge carrier 222 is penetrated, while leaving the well casing and/or well bore walls intact. Unlike a perforating charge, unlined punch charge 240 does not have a liner. In place of a liner, a thin coating 243 of an air-impermeable material may be applied to the otherwise exposed surface of the explosive to prevent oxidation prior to detonation. Coating 243 can comprise paint, shellac, glue, or a similar material that does not react chemically with the explosive. The explosive composition utilized in unlined punch charge 240 is a composition known to those skilled in the art and selected to perform at the temperature encountered in the well adjacent to the interval to be perforated. Commonly used compositions include explosives of grades RDX, HMX, PS, HNS, PYX, and NONA. Optionally, a cap (not illustrated) may be installed to prevent sand from entering the portion of the case which is not filled by the explosive. The cap may comprise any suitable material.

In accordance with the present invention, a sleeve 290 which has a generally tubular configuration (FIG. 10) is positioned around punch charge carrier 222 during manufacture of the seismic source apparatus 220 of the present invention or during final assembly thereof which may take place at the well site. As assembled (FIG. 2), sleeve 290 is secured in positioned around punch charge carrier 222 at one end by tandem sub 260 and by bull plug 266 at the other end. Tandem sub 260 and bull plug 266 may be sized to have an external diameter greater than sleeve 290 so as to inhibit damage to sleeve 290 during positioning within a well bore. Alternatively, protective rings or the like (not illustrated) which have a larger external diameter than sleeve 290 may be inserted between tandem sub 260, bull plug 266 and sleeve 290 during manufacture or final assembly of the apparatus of the present invention so as to inhibit damage to sleeve 290. Sleeve 290 may extend the entire distance between tandem sub 260 and bull plug 266 or a portion thereof. Sleeve 290 is constructed of a water repellant or water proof propellant material which is not physically effected by hydrostatic pressures commonly observed during perforation of a subterranean formation(s) and is unreactive or inert to almost all fluids, in particular those fluids encountered in a subterranean well bore. Preferably, the propellant is a cured epoxy or plastic having an oxidizer incorporated therein such as that commercially available from HTH Technical Services, Inc. of Coeur d'Alene, Id.

Figure 11:
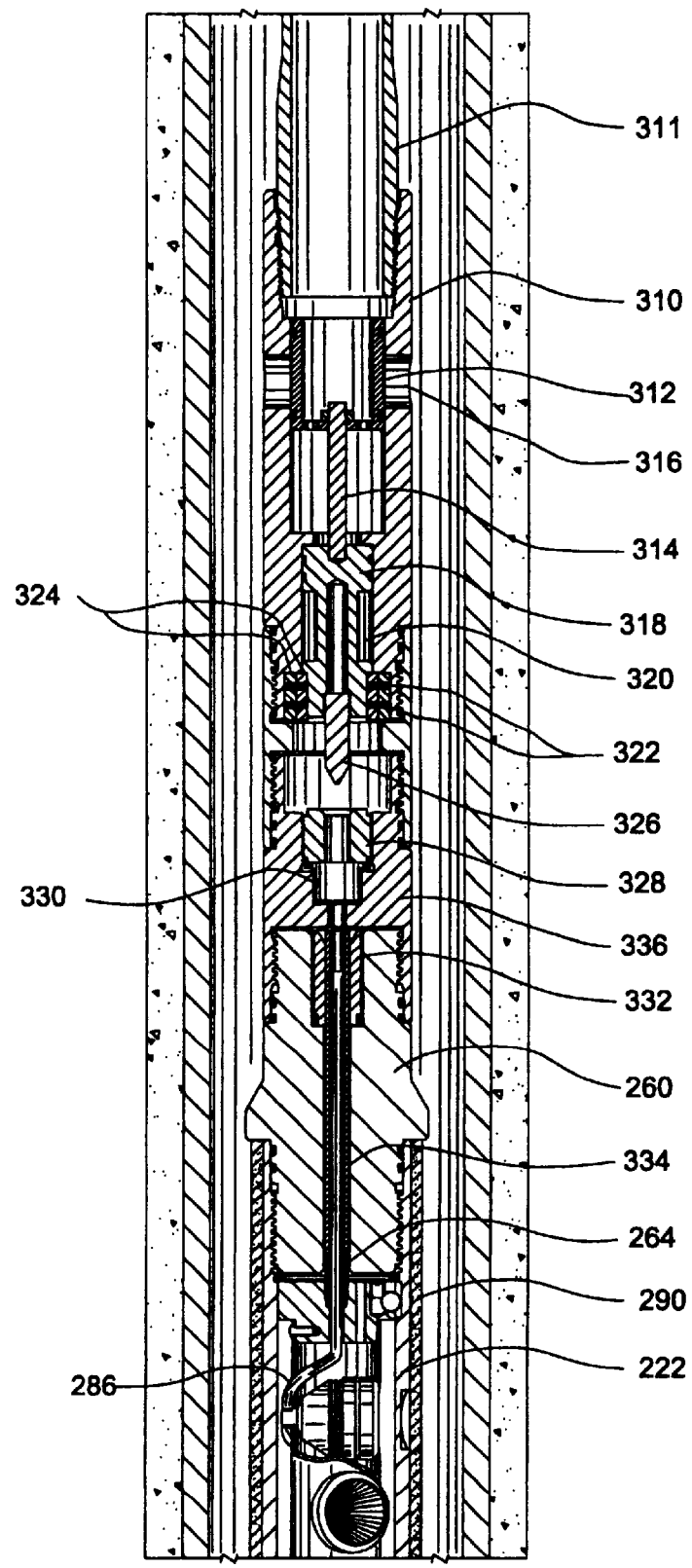
FIG. 11 is a cross section of a portion of a detonating system suitable for use in the present invention.

Any suitable detonating system may be used in conjunction with the seismic source apparatus 220 of the present invention as will be evident to a skilled artisan. An example of such a suitable detonating system suitable is illustrated in FIG. 11. Vent housing 310 is capable of attachment to the end of a tubing string 311 or wireline (not shown). A vent 312 is attached to connecting rod 314 inside vent housing 310 and seals fluid passage 316. Rod 314 is in contact with a piston 318. An annular chamber 320 between piston 318 and the interior wall of housing 310 is filled with air at atmospheric pressure. Adjacent the bottom of piston 318, shear pins 322 are mounted in shear set 324, and a firing pin 326 extends downward from the bottom of piston 318. Retainer 328 joins vent housing 300 and tandem sub 260. Percussion detonator 330 is mounted in retainer 328 in firing head 336 which is attached to vent housing 310 and capable of attachment to tandem sub 260. Sub 260 is attached to punch charge carrier 222. An ignition transfer 332 at the top of sub 260 is in contact with detonating cord 286 passing through central channel 334 and charge carrier 222, as described above. A booster transfer is located in each tandem sub 260, linking the detonating cords in the charge carriers above and below the tandem sub.

Upon application of sufficient hydraulic pressure to the top of piston 318, vent 312 and piston 318 simultaneously move downward, opening fluid passage 314 and causing firing pin 326 to contact percussion detonator 330. The ignition of percussion detonator 330 causes a secondary detonation in ignition transfer 332, which in turn ignites detonating cord 286. Detonating cord 286 comprises an explosive and runs between the ends of each charge carrier, passing between the backs of the charges and the charge clips holding the charges in the carrier. Cord 286 ignites the punch charges 240 in charge carrier 222 and booster transfer, which contains a higher grade explosive than detonating cord 286.

As described above and shown in FIG. 11, an impact detonator provides a primary detonation. If the seismic source apparatus is run on a wireline, the primary detonator could, alternatively, be an electrical detonator. The primary detonator ignites a pressure-sensitive chemical in ignition transfer 232, which in turn ignites detonating cord. The detonating cord then ignites the one or more charges 240 in the carrier 222 simultaneously. Each transfer booster also contains an explosive for detonating the cord 286 in the adjacent carrier. The system may be detonated from the top, the bottom, or both.

Figure 12:
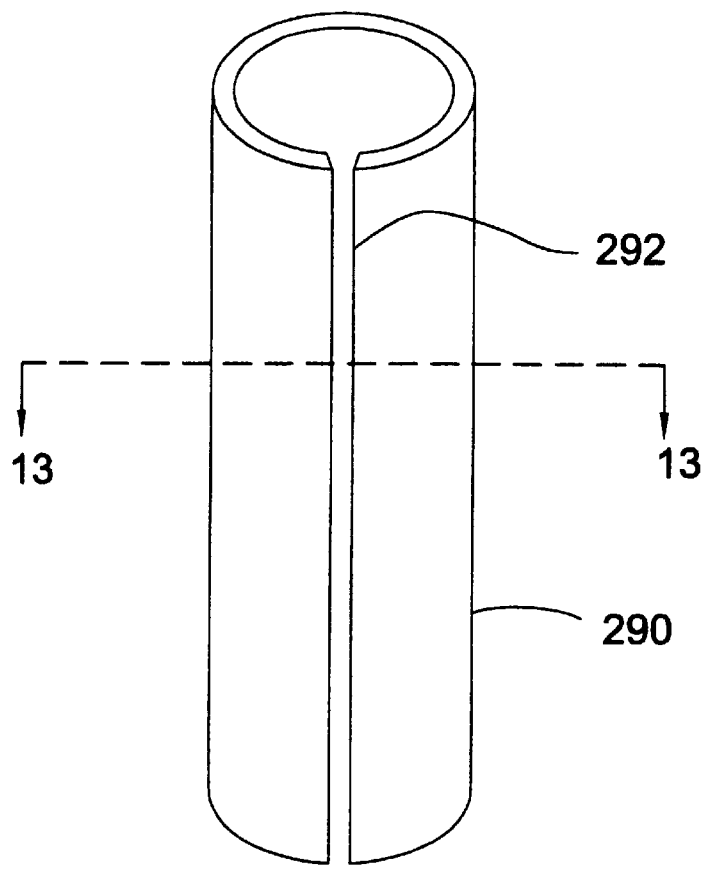
FIG. 12 is a perspective view of another embodiment of the propellant sleeve of the apparatus of the present invention which is illustrated in FIG. 7.
Figure 13:
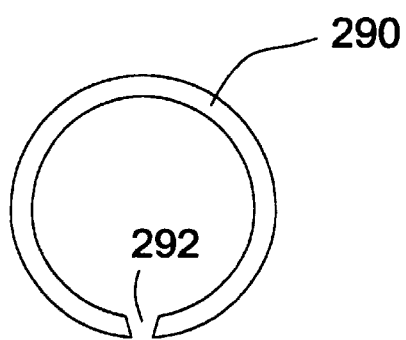
FIG. 13 is a cross sectional view of the propellant sleeve taken along line 13—13 of FIG. 12.
Figure 14:
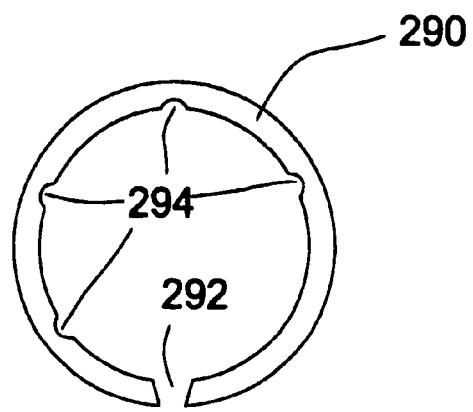
FIG. 14 is a cross sectional view of another embodiment of a propellant sleeve utilized in the apparatus of the present invention which is illustrated in FIG. 7.
Figure 15:
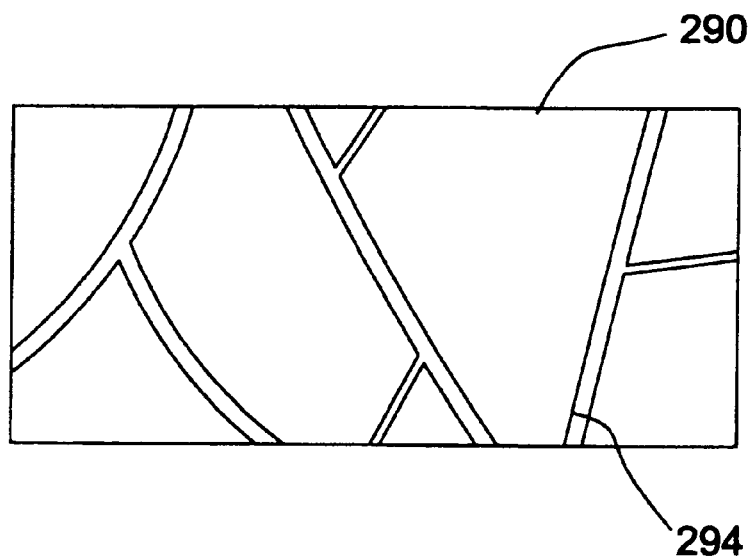
FIG. 15 is a cutaway view of the propellant sleeve embodiment depicted in FIG. 14 which illustrates the interior wall of the sleeve.

In operation, the desired number of punch charge carriers 222 are loaded with charges 240 and are connected with a detonating means, such as detonating cord 286. A string of apparatus 220 separated by tandem subs 260 is assembled at the well site as the units are lowered into well 210 at the end of a tubing string, wireline, slick line, coil tubing or any other suitable means as will be evident to a skilled artisan. Propellant sleeve 290 may be cut from a length of propellant tubular and positioned around punch charge carrier 222 at the well site. The apparatus 220 is then located in the well with the punch charges adjacent the desired subterranean interval 216 of interest where the seismic source apparatus of the present invention is desired to be detonated. The punch charges 240 are then detonated. Upon detonation, each punch charge 240 blasts through a scallop 227 in carrier 232 and penetrates propellant sleeve 290, which breaks apart and ignites due to the shock, heat, and pressure of the detonated punch charge 240. Pressurized gas which generated in well 210 from the burning of propellant sleeve 190 enters formation or interval 216 either directly in the case of an open hole completion or through perforations previously formed in casing 212 thereby generating a seismic wave that propagates through formation or interval 216. The compressional and/or shear waves produced from ignition and burning of the propellant are recorded by one or more conventional geophones 209 which are arranged at the surface of the earth or in nearby well(s) in a predetermined array or pattern. These geophones 209 are timed to record upon passing current to apparatus 220 in order to synchronize recording with the initiation of the propellant burn and the passage of seismic signals. Such synchronization is achieved by means of a device, such as a coil, which is attahced to wireline 18, or other electrical cable if used, so as to detect by induction the current pulse which occurs upon the firing of detonator 330 as will be evident to a skilled artisan. Since the propellant burns slower than other conventional explosives, more seismic or mechanical energy is imparted to the subterranean strata thereby inducing less bore hole damage. By varying the dimensions, i.e. length and /or thickness, of propellant sleeve 290, shear energy resulting from burning the propellant is also varied. As previously mentioned, the configuration of propellant sleeve 290 may also be varied to produce compressional wave or shear wave having a desired signal, i.e. amplitude and/or frequency. Where multiple seismic source apparatus are employed in accordance with the present invention as illustrated in FIG. 1, each source may be separately fired to produce a separate seismic event which is recorded by the geophone array 209 at the surface 203. To assist in ignition, sleeve 290 may be provided with one or more grooves or slits 292 which may extend through the entire thickness of sleeve 290 (FIG. 12) and which may extend substantially the entire length thereof. The slit(s) is positioned adjacent a punch charge 240 such that upon ignition punch charge 240 impacts slit 292 which provides a greater surface area for sleeve 290 to ignite and burn. Preferably, slit(s) 292 is tapered (FIG. 13) such that the slit is wider at the internal surface of sleeve 290 than the external surface thereof. To achieve a uniform and repeatable bum, the internal surface of sleeve 290 may be provided with grooves or channels 294 (FIGS. 14 and 15) to assist in propellant sleeve 290 uniformly breaking upon being impacted by punch charge 240. Grooves or channels 294 may have a varied or a uniform thickness or depth and may be formed in a uniform or random pattern.

Figure 10:
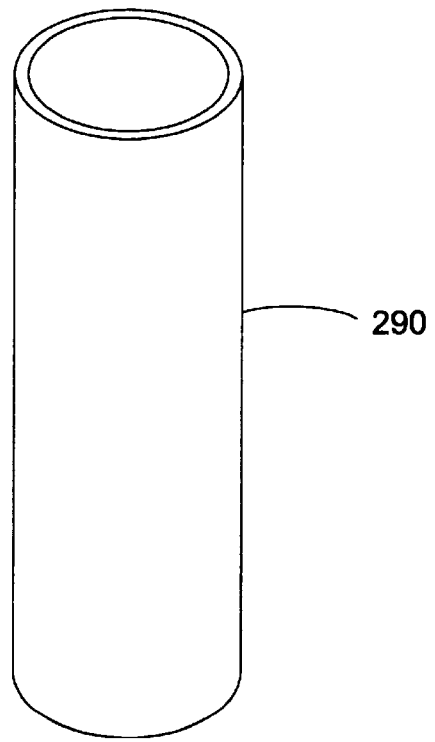
FIG. 10 is a perspective view of one embodiment of the propellant sleeve of the apparatus of the present invention which is illustrated in FIG. 7.

Although the propellant as utilized in this embodiment of the present is described above as being a sleeve, shell or sheath which is generally rigid, the propellant may utilized in different shapes, configurations and/or forms so long as propellant is interposed the well bore walls or casing which is positioned within a subterranean well bore and the at least one punch charge which is positioned within the well bore 210 and/or casing 211. For example, propellant 290 as illustrated in FIG. 10 may be substantially helical or spiral in form and is positioned around perforating charge carrier 222 during manufacture of the perforating and propellant apparatus 220 of the present invention or during final assembly thereof which may take place at the well site. As assembled (FIG. 7), propellant 290 is secured in positioned around perforating charge carrier 222 at one end by tandem sub 260 and by bull plug 266 at the other end. Tandem sub 260 and bull plug 266 may be sized to have an external diameter greater than sleeve 290 so as to inhibit damage to propellant 290 during positioning within a well bore. Alternatively, protective rings or the like (not illustrated) which have a larger external diameter than propellant 290 may be inserted between tandem sub 260, bull plug 266 and propellant 290 during manufacture or final assembly of the apparatus of the present invention so as to inhibit damage to propellant 290. Propellant 290 may extend the entire distance between tandem sub 260 and bull plug 266 or a portion thereof. Alternatively, propellant 290 may be in the form of one or more bands or in the form of one or more generally linear or generally arcuate strips which are positioned about charge carrier 222 so as to be interposed at least one punch charge 240 and casing 212. The bands of propellant 290 may be generally annular and may have gap therein so as to be U-shaped or C-shaped in cross section. As another example, propellant 290 may be flexible and wrapped about all or a portion of charge carrier 222 in any shape or pattern so as to be interposed at least one punch charge 240 and well bore 210 and/or casing 212. In both of these embodiments, propellant 290 may be secured to charge carrier by any suitable means as will be evident to a skilled artisan, such as a commercially available adhesive. Pursuant to a further alternative, propellant 290 is a relatively thin, discrete shape having any suitable peripheral configuration, for example polygonal or a closed plane curve such as a circle, and is secured to the outer surface of charge carrier 222 by any suitable means, for example adhesive or screw threads, so as to be interposed at least one punch charge 240 and well bore 210 and/or casing 212.

Figure 16:
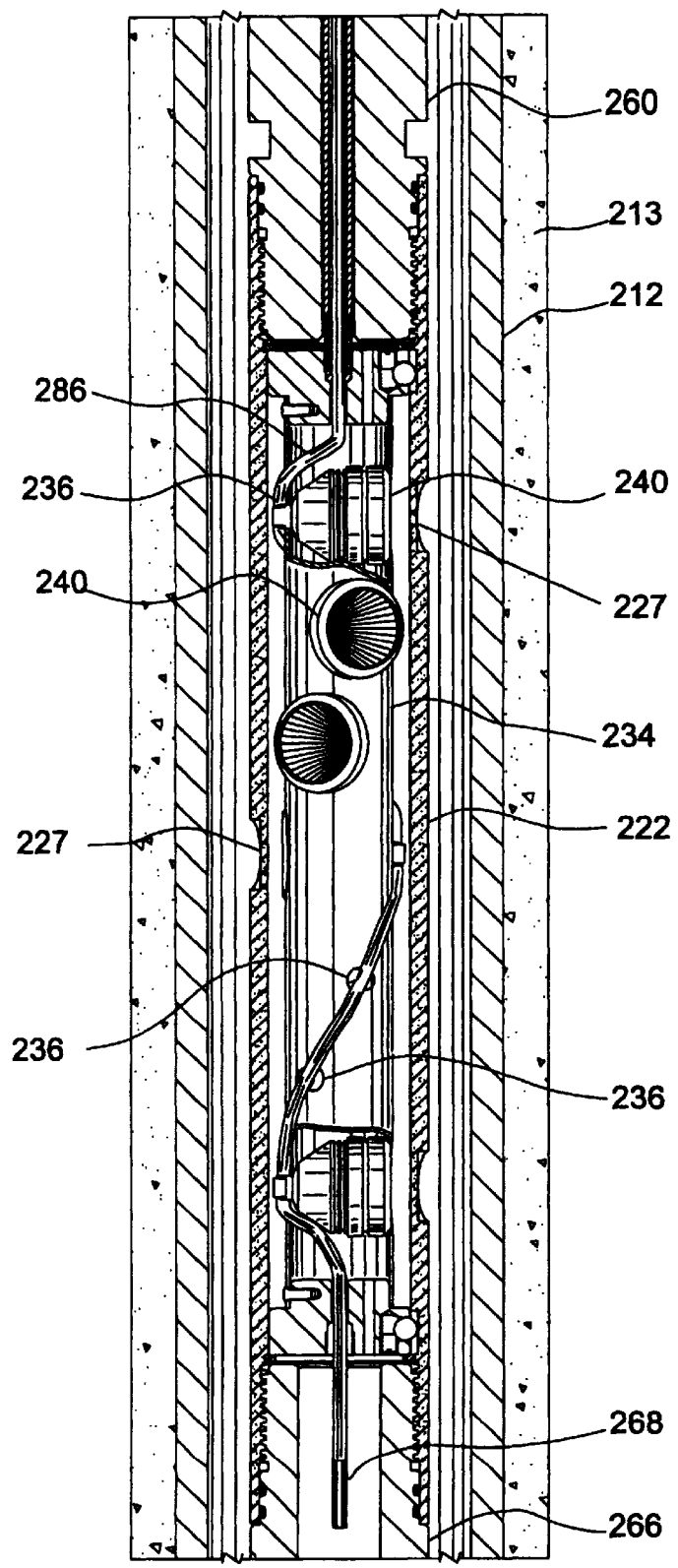
FIG. 16 is a cross sectional view of another embodiment of the apparatus of the present invention as illustrated in FIG. 6.

Referring now to FIG. 16, another embodiment of the seismic source apparatus of the present invention is illustrated generally as 220 and has a punch charge carrier 222 is located between two tandem subs 260 or between a tandem sub 260 and bull plug 226. In this embodiment, carrier 222 is constructed of a water repellant or proof propellant material which is not physically effected by hydrostatic pressures commonly observed during perforation or subterranean formations and is unreactive or inert to almost all fluids, in particular those fluids encountered in a subterranean well bore. Preferably, the propellant is a cured epoxy, carbon fiber composite having an oxidizer incorporated therein such as that commercially available from HTH Technical Services, Inc. of Coeur d'Alene, Id. Carrier 222 contains at least one punch charge 240 which is secured in an opening 236 in punch charge tube 234 with a clip. Preferably, tandem sub 260, bull plug 266 and charge tube 234 are constructed of a material which substantially entirely breaks up or decomposes, for example thin walled steel, a material which substantially disintegrates, for example a carbon fiber, epoxy composite, upon detonation of charges 240, or a material which is completely burnable, such as a epoxy, oxidizer propellant similar to that used for sleeve 290. If more than one punch charges is utilized, they may be spaced vertically along and angularly about the axis of the carrier. The charge density is an appropriate density determined by methods known to those skilled in the art. Common charge densities range between six and twelve per foot. Detonating cord 286 connects a booster transfer in tandem sub 260 above carrier 222, all charges 240, and end cap 268 in bull plug 266. As previously discussed with respect to the embodiment illustrated in FIG. 7, one or more combinations of an additional tandem sub and an additional punch charge carrier could be mounted below carrier 222. The detonating cord 286 would then be connected to a booster transfer in the tandem sub 260 below each additional punch charge carrier. In this embodiment, removal of any portion of the gun from well 210 after detonation is obviated since the carrier is ignited and the charge tube decomposed and/or disintegrated upon detonation of charge(s) 240. This advantage is especially pronounced in instances where a very small amount of space, if any, exists below the interval of formation 216 which is perforated.

The seismic source apparatus of the present invention which is illustrated in FIGS. 6–16 and utilizes propellant to impart seismic energy to subterranean formations can be conveyed into a subterranean well by means of tubing or wireline. The increased strength of the tubing over wireline allows the use of a longer punch and propellant apparatus, thereby allowing a longer interval to be perforated and stimulated in a single trip into a well. A tubing-conveyed apparatus is also compatible with the use of packers to isolate one or more portions of the well adjacent one or more intervals of the formation. Thus, the method may be used where it is desired for some other reason to limit the pressure to which another portion of the well is subjected, for example, in a well where one or more other zones have already been completed. Further, if the well has a high deviation angle from vertical or is horizontal, the tubing may be used to push the punch and propellant apparatus into the well.

Although the various embodiments of the apparatus of the present invention have been described and illustrated as being comprised of several component parts which are secured together in a fluid tight relationship, it is within the scope of the present invention to construct the apparatus 20 or 220 of an integral piece of propellant material which is open to flow of fluids from the well bore and in which punch charges are secured.

Figure 17:
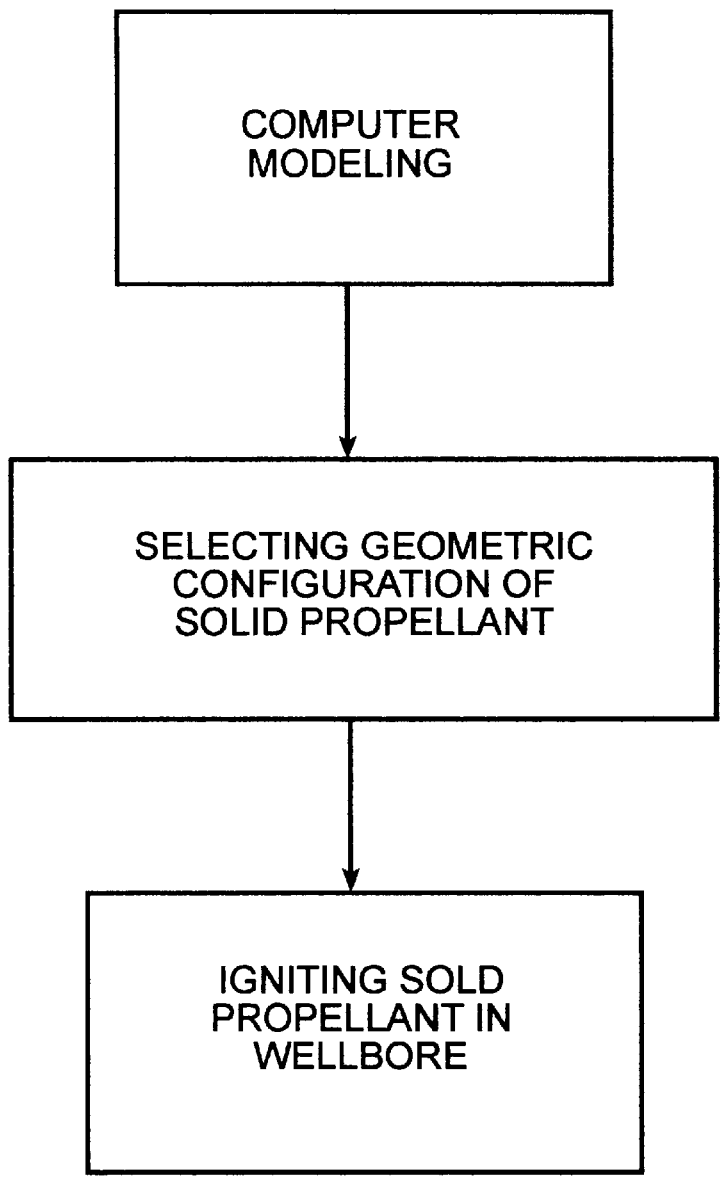
FIG. 17 is a block diagram depicting one embodiment of the process of the present invention.
Figure 18:
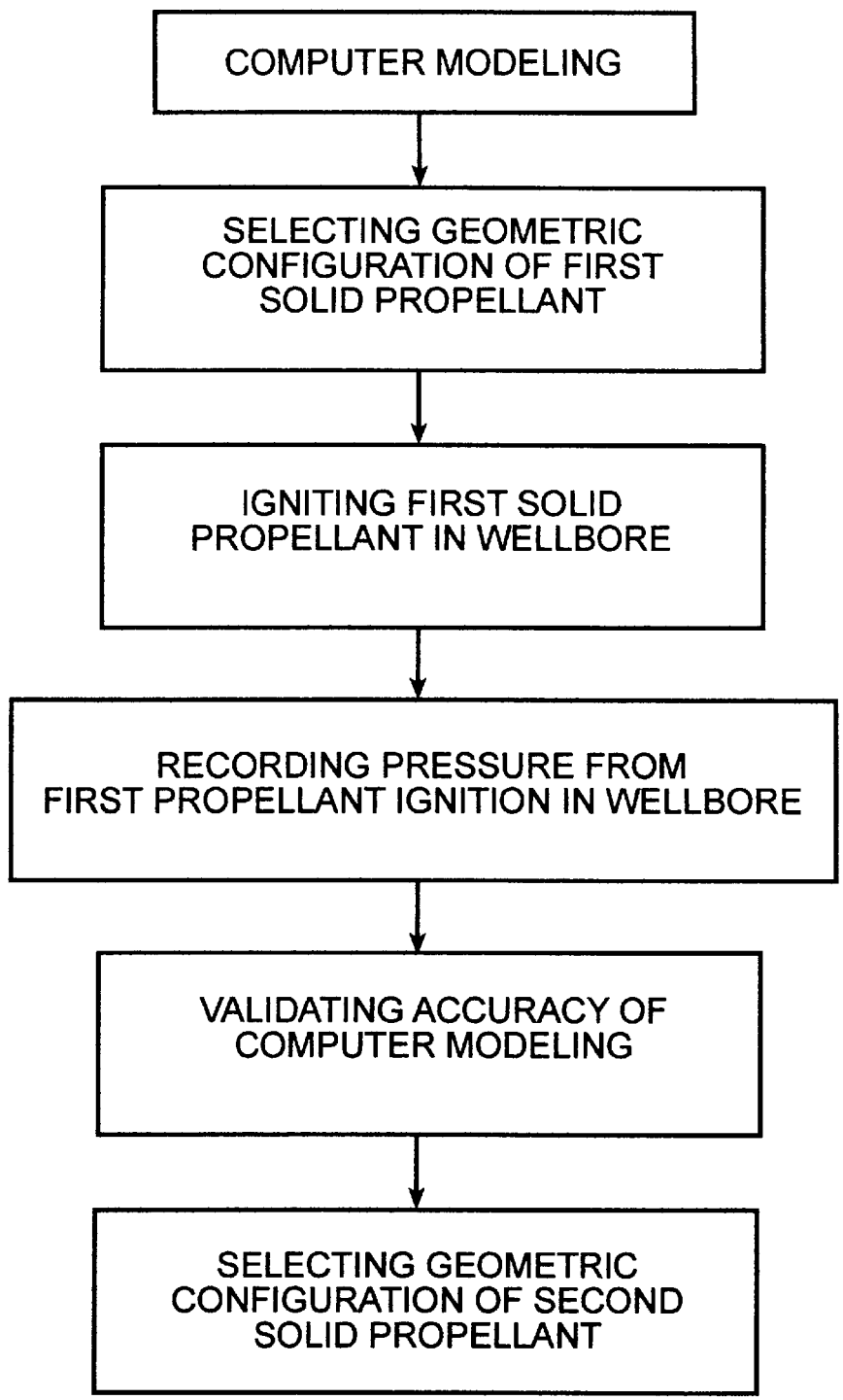
FIG. 18 is a block diagram depicting another embodiment of the process of the present invention.

The seismic source apparatus of the present invention is particularly useful in conducting reverse vertical seismic profiles (VSPs) and cross-well tomography. The relatively long bum of the propellant, i.e. milliseconds, in the apparatus of the present invention creates variable output of shear waves depending upon the dimensions of the propellant. Fast recording pressure, acceleration, and strain gauges, such as those manufactured by Instrumentation and Engineering Services, Inc. of Mary Esther, Fla., may be employed downhole in conjunction with the apparatus of the present invention to provide pressure and acceleration data for comparison to the seismic and/or acoustic data which is recorded from the detonation of the propellant. Such data also provides a basis, along with computer modeling software, such as that sold under the trademark PulsFrac by John F. Schatz Research & Consulting, Inc. of Del Mar, Calif., for modifying the apparatus and propellant to obtain the desired seismic signal with regards to the bandwidth, amplitude, and amount of shear waves which are generated and imparted to the formation. Such computer modeling software for the computation of dynamic well bore events is capable of calculating the pressurization and motion of fluids within a well bore as created by dynamic sources, such as a solid propellant, perforating charges, detonating cord or a combination of these energy sources. These computational models will calculate the amount of energy that can be applied to a uncased borehole before dynamic fracturing of rock will occur as a function of different geometric configurations of the energy source. Likewise, in a cased borehole, the computational models can be utilized to calculate the amount of energy that can be applied to the well bore without mechanical failure of the casing. In accordance with FIGS. 17 and 18, the computer modeling software is utilized to create the desired seismic energy source by selecting the geometric configuration of the propellant before actually conducting work in real well bores. The fast recording pressure, acceleration, and strain gauges from actual field jobs are further utilized to validate the accuracy of the computer modeling estimates by comparing this data to actual data. As an example, results of this work may show that a propellant sleeves of a certain thickness create too much energy which may lead to failure of the casing. Based upon validating the accuracy of the computer modeling, the geometric configuration of subsequent propellant is selected to create the desired seismic energy source.

While the foregoing preferred embodiments of the invention have been described and shown, it is understood that the alternatives and modifications, such as those suggested and others, may be made thereto and fall within the scope of the invention.

We claim:

1. A method for creating a seismic wave in a subterranean environment comprising:
   computer modeling the amount of energy that can be applied to the subterranean environment before dynamic fracturing of the environment will occur and that can be applied to a subterranean well bore without mechanical failure of casing which is positioned in said subterranean well bore;

selecting the geometric configuration of a first solid propellant material based upon said step of computer modeling;

suspending from the surface of the earth said first solid propellant material within said subterranean well bore; and igniting said first solid propellant material in said subterranean well bore thereby generating a seismic wave.

2. The method of claim 1 wherein said step of suspending comprises securing said first solid propellant material on a wireline, slickline, tubing or coil tubing and lowering said first solid propellant material and said wireline, slickline, tubing or coil tubing into said subterranean well.

3. The method of claim 1 further comprising:

recording said seismic wave at a distance from where said first solid propellant material is ignited in said subterranean well bore.

4. The method of claim 3 wherein said seismic wave is recorded at the surface of the earth.

5. The method of claim 3 wherein said seismic wave is recorded in a second subterranean well bore.

6. The method of claim 3 further comprising:

synchronizing said step of recording with said step of igniting said first solid propellant material.

7. The method of claim 1 further comprising:

suspending said first solid propellant material within said subterranean well bore from the surface such that said first solid propellant material is adjacent a subterranean formation of interest.

8. The method of claim 1 further comprising;

igniting an explosive charge which is positioned within said subterranean well bore thereby igniting said first solid propellant material.

9. The method of claim 1 further comprising:

suspending a second solid propellant material within said subterranean well bore from the surface; and igniting said second solid propellant material in said subterranean well bore thereby generating a second seismic wave.

10. The method of claim 9 wherein said first and said second solid propellant materials are substantially simultaneously ignited.

11. The method of claim 9 wherein said first and said second solid propellant materials are ignited at separate times.

12. The method of 11 further comprising:

repositioning said second solid propellant material within said subterranean well bore after said first solid propellant material is ignited but before igniting said second solid propellant material.

13. The method of claim 9 wherein said step of suspending comprises securing said first and said second solid propellant materials at spaced apart locations on a wireline, slickline, tubing or coil tubing and lowering said first and said second solid propellant materials and said wireline, slickline, tubing or coil tubing into said subterranean well.

14. The method of claim 13 wherein said first and said second solid propellant materials are secured at spaced apart locations on said wireline.

15. The method of claim 1 further comprising:

recording in said subterranean well bore the pressure from ignition of said first solid propellant material.

16. The method of claim 9 further comprising:

computer modeling the amount of energy that can be applied to said subterranean environment before dynamic fracturing of said environment will occur and that can be applied to said subterranean well bore without mechanical failure of casing which is positioned in said subterranean well bore; and selecting the geometric configuration of said second solid propellant material based upon said step of computer modeling.

17. The method of claim 1 further comprising:

recording in said subterranean well bore the pressure from ignition of said first solid propellant material.

18. The method of claim 17 further comprising:

validating the accuracy of said computer modeling by comparing the results of said computer modeling to said pressure from ignition of said first solid propellant material.

19. The method of claim 18 further comprising:

selecting the geometric configuration of a second solid propellant material based upon said step of validating the accuracy of said computer modeling.

20. A method of creating a seismic wave in a subterranean formation which is penetrated by a well bore, said method comprising:

computer modeling the amount of energy that can be applied to the subterranean formation before dynamic fracturing of the subterranean formation will occur and that can be applied to the well bore without mechanical failure of casing which is positioned in the well bore;

selecting the geometric configuration of at least one piece of propellant material based upon said step of computer modeling; and detonating at least one explosive charge in said well bore thereby igniting said at least one piece of propellant material which is interposed between said at least one explosive charge and the walls of said well bore.

21. The method of claim 20 further comprising:

lowering said at least one piece of propellant material which is secured on a wireline, slickline, tubing or coil tubing into said subterranean well bore.

22. The method of claim 20 further comprising:

recording said seismic wave at a distance from where said at least one piece of propellant material is ignited in said subterranean well bore.

23. The method of claim 22 wherein said seismic wave is recorded at the surface of the earth.

24. The method of claim 22 wherein said seismic wave is recorded in a second subterranean well bore.

25. The method of claim 22 further comprising:

synchronizing said step of recording with said step of igniting said at least one piece of propellant material.

26. The method of claim 20 further comprising:

suspending said at least one piece of propellant material within said subterranean well bore from the surface such that said at least one piece of propellant material is adjacent a subterranean formation of interest.

27. The method of claim 20 further comprising:

detonating a plurality of explosive charges in said well bore thereby igniting at least one piece of propellant material which is interposed between said at least one explosive charge and the walls of said well bore.

28. The method of claim 27 wherein said plurality of explosive charges ignite a plurality of pieces of propellant material.

29. The method of claim 28 wherein said plurality of explosive charges corresponds to said plurality of pieces of propellant material.

30. The method of claim 28 wherein said plurality of pieces of propellant material are secured on a wireline, slickline, tubing or coil tubing.

31. The method of claim 30 wherein said plurality of pieces of propellant material are secured at spaced apart locations on said wireline, slickline, tubing or coil tubing.

32. The method of claim 15 further comprising:

recording in said subterranean well bore the pressure from ignition of said at least one piece of propellant material.

33. The method of claim 28 further comprising:

computer modeling the amount of energy that can be applied to said subterranean formation before dynamic fracturing of said subterranean formation will occur and that can be applied to said well bore without mechanical failure of casing which is positioned in said well bore; and selecting the geometric configuration of said plurality of pieces of propellant material based upon said step of computer modeling.

34. The method of claim 33 further comprising:

recording in said well bore the pressure from ignition of at least one of said plurality of pieces of propellant material.

35. The method of claim 34 further comprising:

validating the accuracy of said computer modeling by comparing the results of said computer modeling to said pressure from ignition of said at least one of said plurality of pieces of propellant material.

36. The method of claim 35 further comprising:

selecting the geometric configuration of the other pieces of said plurality of pieces of propellant material based upon said step of validating the accuracy of said computer modeling.

37. The method of claim 19 further comprising:

suspending said second solid propellant material within said subterranean well bore from the surface; and igniting said second solid propellant material in said subterranean well bore thereby generating a second seismic wave.

* * * * *